(12) United States Patent
Scheifler

(10) Patent No.: US 6,226,746 B1
(45) Date of Patent: *May 1, 2001

(54) STACK-BASED SYSTEM AND METHOD TO COMBINE SECURITY REQUIREMENTS OF METHODS

(75) Inventor: Robert W. Scheifler, Somerville, MA (US)

(73) Assignee: Sun Microsystems, Inc., Palo Alto, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/044,944

(22) Filed: Mar. 20, 1998

(51) Int. Cl.[7] .................................................. G06F 11/30
(52) U.S. Cl. ........................... 713/200; 713/202; 710/107
(58) Field of Search .................................. 713/200, 202, 713/201; 710/240, 107, 36

(56) References Cited

U.S. PATENT DOCUMENTS

| | | |
|---|---|---|
| 4,491,946 | 1/1985 | Kryskow, Jr. et al. . |
| 4,713,806 | 12/1987 | Oberlander et al. . |
| 4,809,160 * | 2/1989 | Mahon et al. .......................... 713/200 |
| 4,823,122 | 4/1989 | Mann et al. . |
| 4,939,638 | 7/1990 | Stephenson et al. . |
| 4,956,773 | 9/1990 | Saito et al. . |
| 5,088,036 | 2/1992 | Ellis et al. ............................ 395/425 |
| 5,109,486 | 4/1992 | Seymour . |
| 5,187,787 | 2/1993 | Skeen et al. ........................... 395/600 |
| 5,218,699 | 6/1993 | Brandle et al. . |
| 5,257,369 | 10/1993 | Skeen et al. ........................... 395/650 |
| 5,293,614 | 3/1994 | Ferguson et al. ...................... 395/600 |
| 5,297,283 | 3/1994 | Kelly et al. . |
| 5,311,591 * | 5/1994 | Fischer ..................................... 380/4 |

(List continued on next page.)

FOREIGN PATENT DOCUMENTS

| | | |
|---|---|---|
| 0 300 516 | 1/1989 | (EP) . |
| 0 535 792 A2 | 1/1989 | (EP) . |
| 0 351 536 A3 | 1/1990 | (EP) . |
| 0 384 339 | 2/1990 | (EP) . |
| 0 472 874 A1 | 3/1992 | (EP) . |
| 0 474 340 | 3/1992 | (EP) . |

(List continued on next page.)

OTHER PUBLICATIONS

Jaworski, "Java 1.1 Developer's Guide," 2nd Ed., 1997, Sams.net Publishing.
T. Lindholm et al., "The Java Virtual Machine Specification," Addison Wesley, 1996.

(List continued on next page.)

*Primary Examiner*—Ario Etienne
(74) *Attorney, Agent, or Firm*—Finnegan, Henderson, Farabow, Garrett & Dunner, L.L.P.

(57) ABSTRACT

A system obtains the security requirements for an action requested by a thread executing on a computer. The thread invokes a plurality of methods during its execution. The system includes a call stack and a determination unit. The call stack stores an identifier and security requirements for each of the methods in the order that the methods were invoked by the thread. The determination unit combines the method security requirements from the call stack to obtain the security requirements for the requested action.

16 Claims, 5 Drawing Sheets

U.S. PATENT DOCUMENTS

| | | |
|---|---|---|
| 5,339,435 | 8/1994 | Lubkin et al. . |
| 5,386,568 | 1/1995 | Wold et al. . |
| 5,390,328 | 2/1995 | Frey et al. . |
| 5,423,042 | 6/1995 | Jalili et al. . |
| 5,440,744 | 8/1995 | Jacobson et al. . |
| 5,448,740 | 9/1995 | Kiri et al. . |
| 5,455,952 | 10/1995 | Gjovaag . |
| 5,471,629 | 11/1995 | Risch . |
| 5,475,792 | 12/1995 | Stanford et al. . |
| 5,475,817 | 12/1995 | Waldo et al. . |
| 5,481,721 | 1/1996 | Serlet et al. . |
| 5,504,921 | 4/1996 | Dev et al. . |
| 5,511,197 | 4/1996 | Hill et al. . |
| 5,524,244 | 6/1996 | Robinson et al. . |
| 5,553,282 | 9/1996 | Parrish et al. . |
| 5,555,367 | 9/1996 | Premerlani et al. . |
| 5,557,798 | 9/1996 | Skeen et al. ............ 395/650 |
| 5,560,003 | 9/1996 | Nilsen et al. ............ 395/600 |
| 5,561,785 | 10/1996 | Blandy et al. ............ 395/497.01 |
| 5,577,231 * | 11/1996 | Scalzi et al. ............ 395/500 |
| 5,603,031 | 2/1997 | White et al. ............ 395/683 |
| 5,617,537 | 4/1997 | Yamada et al. . |
| 5,628,005 | 5/1997 | Hurvig . |
| 5,640,564 | 6/1997 | Hamilton et al. . |
| 5,652,888 | 7/1997 | Burgess . |
| 5,655,148 | 8/1997 | Richman et al. ............ 395/828 |
| 5,659,751 | 8/1997 | Heninger ............ 395/685 |
| 5,671,225 | 9/1997 | Hooper et al. . |
| 5,675,796 | 10/1997 | Hodges et al. . |
| 5,680,573 | 10/1997 | Rubin et al. . |
| 5,680,617 | 10/1997 | Gough et al. . |
| 5,684,955 | 11/1997 | Meyer et al. . |
| 5,689,709 | 11/1997 | Corbett et al. . |
| 5,706,435 | 1/1998 | Barbara . |
| 5,724,588 | 3/1998 | Hill et al. . |
| 5,727,145 | 3/1998 | Nessett et al. . |
| 5,737,607 | 4/1998 | Hamilton et al. . |
| 5,745,687 * | 4/1998 | Herzberg et al. ............ 709/201 |
| 5,745,695 | 4/1998 | Gilchrist et al. . |
| 5,745,703 | 4/1998 | Cetjin et al. . |
| 5,754,849 | 5/1998 | Dyer et al. . |
| 5,757,925 | 5/1998 | Faybishenko . |
| 5,761,656 | 6/1998 | Ben-Schachar . |
| 5,764,897 | 6/1998 | Khalidi . |
| 5,768,532 | 6/1998 | Megerian . |
| 5,774,551 | 6/1998 | Wu et al. . |
| 5,778,228 | 7/1998 | Wei . |
| 5,778,368 | 7/1998 | Hogan et al. . |
| 5,787,425 | 7/1998 | Bigus . |
| 5,787,431 | 7/1998 | Shaughnessy . |
| 5,809,507 | 9/1998 | Cavanaugh, III . |
| 5,813,013 | 9/1998 | Shakib et al. . |
| 5,815,149 | 9/1998 | Mutschler, III et al. . |
| 5,815,709 | 9/1998 | Waldo et al. . |
| 5,815,711 | 9/1998 | Sakamoto et al. . |
| 5,829,022 | 10/1998 | Watanabe et al. . |
| 5,832,529 | 11/1998 | Wollrath et al. . |
| 5,832,593 | 11/1998 | Wurst et al. . |
| 5,835,737 | 11/1998 | Sand et al. . |
| 5,842,018 | 11/1998 | Atkinson et al. . |
| 5,844,553 | 12/1998 | Hao et al. . |
| 5,845,129 * | 12/1998 | Wendorf et al. ............ 710/200 |
| 5,860,004 | 1/1999 | Fowlow et al. . |
| 5,860,153 | 1/1999 | Matena et al. . |
| 5,864,862 | 1/1999 | Kriens et al. . |
| 5,864,866 | 1/1999 | Henckel et al. . |
| 5,872,928 | 2/1999 | Lewis et al. . |
| 5,875,335 | 2/1999 | Beard . |
| 5,878,411 | 3/1999 | Borroughs et al. . |
| 5,884,079 | 3/1999 | Furusawa . |
| 5,887,134 | 3/1999 | Ebrahim . |
| 5,890,158 | 3/1999 | House et al. . |
| 5,892,904 * | 4/1999 | Atkinson et al. ............ 713/201 |
| 5,933,497 | 8/1999 | Beetcher et al. . |
| 5,935,249 | 8/1999 | Stern et al. . |
| 5,940,827 | 8/1999 | Hapner et al. . |
| 5,946,485 | 8/1999 | Weeren et al. . |
| 5,946,694 | 8/1999 | Copeland et al. . |
| 5,966,531 | 10/1999 | Skeen et al. . |
| 6,003,763 | 12/1999 | Gallagher et al. . |

FOREIGN PATENT DOCUMENTS

| | | |
|---|---|---|
| 0 555 997 | 8/1993 | (EP) . |
| 0 565 849 | 10/1993 | (EP) . |
| 0 569 195 A2 | 11/1993 | (EP) . |
| 0 625 750 | 11/1994 | (EP) . |
| 0 651 328 | 5/1995 | (EP) . |
| 0 660 231 | 6/1995 | (EP) . |
| 0 718 761 | 12/1995 | (EP) . |
| 0 697 655 A2 | 2/1996 | (EP) . |
| 0 767 432 A2 | 4/1997 | (EP) . |
| 0 810 524 | 5/1997 | (EP) . |
| 0 778 520 A2 | 6/1997 | (EP) . |
| 0 794 493 A2 | 9/1997 | (EP) . |
| 0 803 810 A2 | 10/1997 | (EP) . |
| 0 803 811 | 10/1997 | (EP) . |
| 0 805 393 A2 | 11/1997 | (EP) . |
| 0 817 020 | 1/1998 | (EP) . |
| 0 817 022 A2 | 1/1998 | (EP) . |
| 0 817 025 | 1/1998 | (EP) . |
| 0 836 140 A2 | 4/1998 | (EP) . |
| 2 253 079 | 8/1992 | (GB) . |
| 2 262 825 | 6/1993 | (GB) . |
| 2 305 087 | 3/1997 | (GB) . |
| 11-45187 | 2/1999 | (JP) . |
| WO92/07335 | 4/1992 | (WO) . |
| WO92/09948 | 6/1992 | (WO) . |
| WO94/03855 | 2/1994 | (WO) . |
| WO96/03692 | 2/1996 | (WO) . |
| WO96/10787 | 4/1996 | (WO) . |
| WO96/18947 | 6/1996 | (WO) . |
| WO96/24099 | 8/1996 | (WO) . |
| WO98/02814 | 1/1998 | (WO) . |
| WO 98/04971 | 2/1998 | (WO) . |

OTHER PUBLICATIONS

R. Jones et al., "Garbage Collection, Algorithms For Automatic Dynamic Memory Management," 1996.

Birrell et al., "Implementing Remote Procedure Calls," ACM Transactions on Computer Systems, vol. 2, No. 1, Feb. 1984, pp. 39–59.

Emms, J.M., "A Definition of an Access Control Systems Language," Computer Standards & Interfaces 6, No. 4, pp. 443–454 (1987) Amsterdam, The Netherlands.

Mullender, *Distributed Systems,* Second Edition, Addison-–Wesley, 1993.

Howard et al., Scale and Performance in a Distributed File System, ACM Transactions on Computer Systems, vol. 6, No. 1, Feb. 1988, pp. 51–81.

Cardelli, Obliq, A lightweight language for network objects, Nov. 5, 1993, pp. 1–37.

Dijkstra, Self–stabilizing Systems in Spite of Distributed Control, Communications of the ACM, vol. 17, No. 11, Nov. 1974, pp. 643–644.

Ousterhout et al., The Sprite Network Operating System, Computer, IEEE, Feb. 1988, pp. 23–36.

Dourish, A Divergence–Based Model of Synchrony and Distribution in Collaborative Systems, Xerox Technical Report EPC–1994–102, 1994, pp. 1–10.

Sharrott et al., ObjectMap: Integrating High Performance Resources into a Distributed Object–oriented Environment, ICODP, 1995.

Birrell et al., Grapevine: An Exercise in Distributed Computing, Communications of the ACM, vol. 25, No. 4, Apr. 1982, pp. 260–274.

Transparent Network Computing, Locus Computing Corporation, Jan. 5, 1995.

Gray et al., Leases: An Efficient Fault–Tolerant Mechanism for Distributed File Cache Consistency, ACM, 1989, pp. 202–210.

Lamport et al., The Byzantine Generals Problem, ACM Transactions on Programming Languages and Systems, vol. 4, No. 3, Jul. 1982, pp. 382–401.

Dolev et al., On the Minimal Synchronism Needed for Distributed Consensus, Journal of the ACM, vol. 34, No. 1, Jan. 1987, pp. 77–97.

Mummert et al., Long Term Distributed File Reference Tracing: Implementation and Experience, Carnegie Mellon University School of Computer Science, Nov. 1994, pp. 1–28.

Gelernter et al., Parallel Programming in Linda, Yale University, Jan. 1985, pp. 1–21.

Cannon et al., Adding Fault–Tolerant Transaction Processing to Linda, Software–Practice and Experience, vol. 24(5), May 1994, pp. 449–466.

Kambhatla et al., Recovery with Limited Replay: Fault–Tolerant Processes in Linda, Oregon Graduate Institute, Technical Report CS/E 90–019, Sep. 1990, pp. 1–16.

Anderson et al., Persistent Linda: Linda + Transactions + Query Processing, Proceedings of the 13th Symposium on Fault Tolerant Systems, 1994, pp. 93–109.

Gelernter, Generative Communication in Linda, ACM Transactions on Programming Languages and Systems, vol. 7, No. 1, Jan. 1985, pp. 80–112.

Carriero et al., Distributed Data Structures in Linda, Principals of Programming Language, 1986, pp. 1–16.

Pinakis, Using Linda as the Basis of an Operating System Microkernel, University of Western Australia, Department of Computer Science, Aug. 1993, pp. 1–165.

Linda Database Search, Jul. 20, 1995, pp. 1–68.

Carriero et al, Distributed Data Structures in Linda, Yale Research Report YALEU/DCS/RR–438, Nov. 1985, pp. 1–16.

Agha et al., Actorspaces: An Open Distributed Programming Paradigm, University of Illinois, Report No. UIUCDCS–R–92–1766, Open Systems Laboratory TR No. 8, Nov. 1992, pp. 1–12.

Ahmed et al., A Program Building Tool for Parallel Applications, Yale University, Dec. 1, 1993, pp. 1–23.

Liskov et al., Distributed Object Management in Thor, International Workshop on Distributed Object Management, 1992.

Coulouris et al., Distributed Systems Concepts and Designs, Second Edition, Addison–Wesley, 1994.

Birrell et al., Network Objects, DEC SRC Research Report 115, Feb. 28, 1994.

Birrell et al., Distributed Garbage Collection for Network Objects, DEC SRC REsearch Report 116, Dec. 15, 1993.

Wollrath et al., A Distributed Object Model for the Java™ System, USENIX Association, Conference on Object–Oriented Technologies and Systems, Jun. 17–21, 1996, pp. 219–231.

Harris et al., Proposal for a General Java Proxy Class for Distributed Systems and Other Uses, Netscape Communications Corp., Jun. 25, 1997.

Hamilton, Java and the Shift to Net–Centric Computing, Computer, Aug. 1996, pp. 31–39.

Chung et al., A "Tiny" Pascal Compiler: Part 1: The P–Code Interpreter, BYTE Publications, Inc., Sep. 1987.

Chung et al., A "Tiny" Pascal Compiler: Part 2: The P–Compiler, BYTE Publications, Inc., Oct. 1978.

Thompson, Regular Expression Search Algorithm, Communications of the ACM, vol. II, No. 6, Jun. 1968, pp. 419–422.

Mitchell et al., *Mesa Language Manual*, Xerox Corporation, pp. 1–150.

McDaniel, An Analysis of a Mesa Instruction Set, Xerox Corporation, May 1982, pp. 1–17.

Pier, A Retrospective on the Dorado, A High–Performance Personal Computer, Xerox Corporation, Aug. 1983, pp. 1–40.

Pier, A Retrospective on the Dorado, A High–Performance Personal Computer, IEEE Conference Proceedings, The 10th Annual International Symposium on Computer Architecture, 1983, pp. 252–269.

Krasner, The Smalltalk–80 Virtual Machine, BYTE Publications Inc., Aug. 1991, pp. 300–320.

Birrell et al., Network Objects, Operating Systems Review, ACM Press, vol. 27, No. 5, Dec. 1993, pp. 217–230.

Remote Method Invocation Specification, Sun Microsystems, Inc., (1997), http://java.sun.com/products/jdk/1.1/docs/guide/rmi/spec/rmiTOC.doc.html.

Alexander, et al., "Active Bridging", Proceedings of the ACM/SIGCOMM'97 Confernece, Cannes, France, Sep. 1997.

Anonymous: "Change–Notification Service for Shared Files" IBM Technical Disclosure Bulletin, vol. 36, No. 8, pp. 77–82, XP002108713 New York, US.

Anonymous: "Resource Preemption for Priority Scheduling." Nov. 1973. IBM Technical Disclosure Buleltin, vol. 16, No. 6, p. 1931 XP002109435 New York, US.

Beech et al., "Object Databases as Generalizations of Relational Databases," Computer Standards & Interfaces, vol. 13, Nos. 1/3, pp. 221–230, (Jan. 1991) Amsterdam, NL.

Bertino et al., "Object–0riented Database Management Systems: Concepts and Issues," Computer, vol. 24, No. 4, pp. 33–47, (Apr. 1991), Los Alamitos, CA.

Betz, Mark; "Interoperable objects: laying the foundation for distributed object computing"; Dr. Dobbs's Journal, vol. 19, No. 11, p. 18(13); (Oct. 1994).

Bevan, D.I., "An Efficient Reference Counting Solution To The Distributed Garbage Collection Problem", Parall Computing, NL, Elsevier Publishers, Amsterdam, vol. 9, No. 2, pp. 179–192.

Dave A et al: "Proxies, Application Interface, and Distributed Systems", Proceedings International Workshop on Object Orientation in Operating Systems, Sep. 24, 1992, pp. 212–220.

Deux O et al: "The 02 System" Communications of the Association for Computing Machinery, vol. 34, No. 10, Oct. 1991, pp. 34–48.

Drexler, K. Eric, et al., "Incentive Engineering for Computational Resource Management," The Ecology of Computation, Elsevier Science Publishers B.V., 1988, pp. 231–266.

Droms, R., "RFC 1541 Dynamic Host Configuration Protocol", http://www.cis.ohio–state.edu/htbin/rfc/rfc1541.html, Oct. 1993, pp. 1–33.

Gosling et al., "The Java (TM) Language Specification", Addison–Wesley, 1996.

Gottlob et al., "Extending Object–Oriented Systems with Roles," ACM Transctions on information systems, vol. 14, No. 3, pp. 268–296 (Jul. 1996).

Guth, Rob: "JavaOne: Sun to Expand Java Distributed Computing Effort", "http://www.sunworld.com/swol–02–1998/swol–02–sunsopot.html," XP–002109935, p. 1, 1998.

Hamilton et al., "Subcontract: a flexible base for distributed programming"; Proceedings of 14th Symposium of Operating System Principles; (Dec. 1993).

Hartman, J., Manber, U., et al., Liquid Software: A new paradigm for networked systems, Technical Report 96–11, Department of Comp. Sci., Univ. of Arizona, Jun. 1996.

Hunt, N., "IDF: A Graphical Data Flow Programming Language for Image Processing and Computer Vision", Proceedings of the International Conference on Systems, Man, and Cybernetics, Los Angeles, Nov. 4–7, pp. 351–360, (1990).

IBM (TM) Technical Disclosure Bulletin,"Object Location Algorithm," vol. 36, No. 09B, pp. 257–258, Sep. 1993.

IBM (TM) Technical Disclosure Bulletin, "Retrieval of Qualified Variables Using Extendible Hashing," vol. 36, No. 12, pp. 301–303, Dec. 1993.

IBM: "Chapter 6—Distributed SOM (DSOM)" SOMOBJECTS Developer Toolkit Users Guide, Version 2.1, Oct. 1994 (1994–10), pp. 6–1–6–90.

Kay, Michael H. et al.,"An Overview of the Raleigh Object–Oriented Database System", ICL Technical Journal, vol. 7, No. 4, pp. 780–798, (Nov. 1991), Oxford, GB.

Kougiouris et al.; "Support for Space Efficient Object Invocation in Spring"; (Sep. 1994).

Mitchell et al.; "An Overview of the Spring System"; (Feb. 1994).

Orfali R. et al., "The Essential Distributed Objects Survival Guide," Chapter 11: Corba Commercial ORBs, pp. 203–215, John Wiley & Sons, Inc., (1996).

Riggs Roger et al., "Pickling State in the Java (TM) System," USENIX Association Conference on Object–Oriented Technologies and Systems, XP–002112719, Jun. 17–21, 1996, pp. 241–250.

Rosenberry et al., "Understanding DCE"; Chapters 1–3, 6; (1992).

Venners, B., "Jini Technology, Out of the Box", Javaworld, Online!, pp. 1–4, Dec. 1998.

Waldo J et al: "Events in a RPC based distributed system" Proceedings of the 1995 USENIX Technical Conference, Proceedings USENIX Winter 1995 Technical Conference, New Orleans, LA. USA, Jan. 16–20, 1995, pp. 131–142.

Wilson, P.R., et al., "Design of the Opportunistic Garbage Collector," Proceedings of the Object Oriented Programming Systems Languages And Applications Conference, New Orleans, vol. 24, No. 10, Oct. 1989.

Wu, Xuequn, "A Type system for an Object–Oriented Database System," Proceedings of the International Computer Software and Applications Conference (COMPSAC), pp. 333–338, Sep. 11–13, 1991, Tokyo, Japan.

Yemini, Y. and S. da silva, "Towards Programmable Networks", IFIP/IEEE International Workshop on Distributed Systems: Operations and Management, L'Aquila, Italy, Oct. 1996.

Yin J. et al., "Using Leases to Support Server Driven Consistency in Large–Scale Systems", Computer Services Department, University of Texas at Austin, p. 285–294.

* cited by examiner

STACK-BASED SYSTEM AND METHOD TO COMBINE SECURITY REQUIREMENTS OF METHODS

RELATED APPLICATIONS

The following identified U.S. patent applications are relied upon and are incorporated by reference in this application.

U.S. patent application entitled "Controlling Access to a Resource," filed on Dec. 11, 1997, and accorded Ser. No. 08/988,431.

U.S. patent application entitled "Protection Domains to Provide Security in a Computer System," filed on Dec. 11, 1997, and accorded Ser. No. 08/988,439.

U.S. patent application entitled "Secure Class Resolution, Loading and Definition," filed on Dec. 11, 1997, and accorded Ser. No. 08/988/660.

U.S. patent application entitled "Typed, Parameterized, and Extensible Access Control Permissions," filed on Dec. 11, 1997, and accorded Ser. No. 08/988,857.

U.S. patent application entitled "Layer-Independent Security for Communication Channels," filed on Jun. 26, 1997, and accorded Ser. No. 08/883,636.

Provisional U.S. patent application Ser. No. 60/076,048, entitled "Distributed Computing System," filed on Feb. 26, 1998.

U.S. patent application Ser. No. 09/044,923, entitled "Method and System for Leasing Storage," and filed on the same date herewith.

U.S. patent application Ser. No. 09/044,838, entitled "Method, Apparatus, and Product for Leasing of Delegation Certificates in a Distributed System," and filed on the same date herewith.

U.S. patent application Ser. No. 09/044,834, entitled "Method, Apparatus and Product for Leasing of Group Membership in a Distributed System," and filed on the same date herewith.

U.S. patent application Ser. No. 09/044,916, entitled "Leasing for Failure Detection," filed on the same date herewith.

U.S. patent application Ser. No. 09/044,933, entitled "Method for Transporting Behavior in Event Based System," and filed on the same date herewith.

U.S. patent application Ser. No. 09/044,918, entitled "Deferred Reconstruction of Objects and Remote Loading for Event Notification in a Distributed System," and filed on the same date herewith.

U.S. patent application Ser. No. 09/044,938, entitled "Methods and Apparatus for Remote Method Invocation," and filed on the same date herewith.

U.S. patent application Ser. No. 09/045,652, entitled "Method and System for Deterministic Hashes to Identify Remote Methods," and filed on the same date herewith.

U.S. patent application Ser. No. 09/044,790, entitled "Method and Apparatus for Determining Status of Remote Objects in a Distributed System," and filed on the same date herewith.

U.S. patent application Ser. No. 09/044,930, entitled "Downloadable Smart Proxies for Performing Processing Associated with a Remote Procedure Call in a Distributed System," and filed on the same date herewith.

U.S. patent application Ser. No. 09/044,917, entitled "Suspension and Continuation of Remote Methods," and filed on the same date herewith.

U.S. patent application Ser. No. 09/044,835, entitled "Method and System for Multi-Entry and Multi-Template Matching in a Database," and filed on the same date herewith.

U.S. patent application Ser. No. 09/044,839, entitled "Method and System for In-Place Modifications in a Database," and filed on the same date herewith.

U.S. patent application Ser. No. 09/044,945, entitled "Method and System for Typesafe Attribute Matching in a Database," and filed on the same date herewith.

U.S. patent application Ser. No. 09/044,931, entitled "Dynamic Lookup Service in a Distributed System," and filed on the same date herewith.

U.S. patent application Ser. No. 09/044,939, entitled "Apparatus and Method for Providing Downloadable Code for Use in Communicating with a Device in a Distributed System," and filed on the same date herewith.

U.S. patent application Ser. No. 09/044,826, entitled "Method and System for Facilitating Access to a Lookup Service," and filed on the same date herewith.

U.S. patent application Ser. No. 09/044,932, entitled "Apparatus and Method for Dynamically Verifying Information in a Distributed System," and filed on the same date herewith.

U.S. patent application Ser. No. 09/030,840, entitled "Method and Apparatus for Dynamic Distributed Computing Over a Network," and filed on Feb. 26, 1998.

U.S. patent application Ser. No. 09/044,936, entitled "An Interactive Design Tool for Persistent Shared Memory Spaces," and filed on the same date herewith.

U.S. patent application Ser. No. 09/044,934, entitled "Polymorphic Token-Based Control," and filed on the same date herewith.

U.S. patent application Ser. No. 09/044,915, entitled "Stack-Based Access Control," and filed on the same date herewith.

U.S. patent application Ser. No. 09/044,837, entitled "Per-Method Designation of Security Requirements," and filed on the same date herewith.

BACKGROUND OF THE INVENTION

The present invention is directed to security measures in a computer system and, more particularly, to systems and methods that combine security requirements of methods in a calling hierarchy of a thread executing on a computer.

Distributed systems usually contain a number of different computers interconnected by communications networks. Oftentimes, a client-server relationship is established between communicating computers. Typically, a "client" is defined as a process making a call to request resources located or controlled by a "server" process. In this context, the computers executing the requesting process and the server process may also be referred to as a client and server, respectively. However, these roles may change depending on the context of information and particular processing taking place.

One mechanism that facilitates the client-server relationship is the Remote Procedure Call (RPC) where the client invokes a function of the server. The RPC is a mechanism that provides synchronized communication between two processes operating on the same or different computers. The RPC mechanism is usually implemented in two parts: one part on the client side and the other part on the server side.

Security is an issue that always arises when client and server computers communicate. A breach in security can severely hamper the operation of both the client's and server's computers. Thus, organizations that use computer systems are vulnerable to persons who may intentionally or unintentionally cause the computer systems to malfunction or who may steal the organizations' confidential information.

System operators typically address three types of security issues: (1) preventing interception and alteration of messages; (2) controlling access to a server; and (3) authenticating a server by a client. System operators have conventionally addressed these issues in object-oriented programming enviromnents by defining a security class that provides methods for setting communication requirements. One such object-oriented programming environment is Sun Microsystems™Java™object-oriented programming environment described in Jaworski, *Java 1.1 Developer's Guide*, Sams.net, 1997, which is hereby incorporated by reference.

The security class includes five communication requirements: CONFIDENTIALITY, INTEGRITY, ANONYMITY, AUTHENTICATE_SERVER, and NO_DELEGATION. CONFIDENTIALITY ensures that message contents are private. System operators use encryption techniques to assure that only parties with the proper decryption key can decipher the message. INTEGRITY detects when message contents (both requests and replies) have been altered, and refuses to process altered messages. System operators may accomplish this through the use of checksums, or the like, at both the client and server locations.

ANONYMITY represents the client desiring to remain anonymous. In other words, the client does not want to be authenticated by the server. AUTHENTICATE_SERVER represents the client needing to authenticate the server before invoking a remote method. Through this communication requirement, the client ensures that it is communicating with the correct server. NO_DELEGATION refers to the server not being permitted to delegate under the client's identity in calls that it makes. In other words, the server is not authorized to make calls to other computer systems pretending to be the client.

At the client's location, the security class is represented by a single bit for each communication requirement. By setting the bits corresponding to CONFIDENTIALITY, INTEGRITY, ANONYMITY, AUTHENTICATE_SERVER, and NO_DELEGATION, the client designates that confidentiality will be ensured, that integrity will be ensured, that the client will remain anonymous, that the server will be authenticated, and that delegation will not be permitted, respectively.

Conventionally, a client indicates the security class preferences on a global context or on a per-reference basis. In a conventional RPC system, the client usually has a reference to the server. This "server reference" typically contains network information, such as the network address of the server's host; protocol information, such as to which port on the host should a connection be made; and an object identifier that identifies theserver object that will be the subject of the call. Therefore, "per-reference" means that communication requirements are set on an instance of a server reference and, thus, are used by any calls made with that server reference.

If the client sets communication requirements on a global context during the execution of one method, those communication requirements may be overridden by a later method, either by the later method overwriting the global context or by setting communication requirements on a per-reference basis. Even if the client sets communication requirements on a per-reference basis during execution of one method, those communication requirements may be overridden by a later method, by the later method overwriting the communication requirements on that same server reference.

For example, suppose that a client invokes a first method that in turn invokes a second method, passing to the second method a server reference. Suppose that the second method performs a function X on a remote server using that server reference. Suppose firther that the first method has confidential and integrity communication requirements, and sets those requirements either on a global context or on the server reference prior to passing the reference to the second method. Suppose further that the second method overwrites the communication requirements on the reference passed to it, replacing them with a communication requirement for only authenticating the server. In a conventional system, the communication requirements of the second method override the communication requirements of the first method, so the call to the server will only authenticate the server. As a result, the confidentiality and integrity requested by the first method will not be ensured.

The conventional security class preference designation fails to ensure that the individual communication requirements of the methods included in a calling hierarchy will be followed. Accordingly, it is desirable to improve security requirement designation in communication systems.

SUMMARY OF THE INVENTION

Systems and methods consistent with the principles of the present invention address this need by combining communication requirements of methods in a calling hierarchy. That is, the individual communication requirements of the methods are combined to obtain the strictest set of communication requirements proper for the call.

A system consistent with the principles of the present invention obtains the security requirements for an action requested by a thread executing on a computer. The thread invokes a plurality of methods during its execution. The system includes a call stack and a determination unit. The call stack stores an identifier and security requirements for each of the methods in the order that the methods were invoked by the thread. The determination unit combines the method security requirements from the call stack to obtain the security requirements for the requested action.

BRIEF DESCRIPTION OF THE DRAWINGS

The accompanying drawings, which are incorporated in and constitute a part of this specification, illustrate an embodiment of the invention and, together with the description, explain the objects, advantages, and principles of the invention. In the drawings.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims and equivalents.

Systems and methods consistent with the principles of the present invention combine the communication requirements of each routine (ie., function, method) of a thread requesting an action to access a resource. When a request for the action is detected, a determination is made of the communication requirements for the action based on the communication requirements associated with routines in a calling hierarchy associated with the thread. A calling hierarchy indicates the routines that have been invoked by or on behalf of a thread but have not been exited.

OVERVIEW OF THE DISTRIBUTED SYSTEM

Methods and systems consistent with the present invention operate in a distributed system ("the exemplary distributed system") with various components, including both hardware and software. The exemplary distributed system (1) allows users of the system to share services and resources over a network of many devices; (2) provides programmers with tools and programming patterns that allow development of robust, secured distributed systems; and (3) simplifies the task of administering the distributed system. To accomplish these goals, the exemplary distributed system utilizes the Java™ programming environment to allow both code and data to be moved from device to device in a seamless manner. Accordingly, the exemplary distributed system is layered on top of the Java programming environment and exploits the characteristics of this environment, including the security offered by it and the strong typing provided by it. The Java programming environment is more clearly described in Jaworski, *Java 1.1 Developer's Guide*, Sams.net, 1997.

In the exemplary distributed system, different computers and devices are federated into what appears to the user to be a single system. By appearing as a single system, the exemplary distributed system provides the simplicity of access and the power of sharing that can be provided by a single system without giving up the flexibility and personalized response of a personal computer or workstation. The exemplary distributed system may contain thousands of devices operated by users who are geographically disperse, but who agree on basic notions of trust, administration, and policy.

Within the exemplary distributed system are various logical groupings of services provided by one or more devices, and each such logical grouping is known as a Djinn. A "service" refers to a resource, data, or functionality that can be accessed by a user, program, device, or another service and that can be computational, storage related, communication related, or related to providing access to another user. Examples of services provided as part of a Djinn include devices, such as printers, displays, and disks; software, such as applications or utilities; information, such as databases and files; and users of the system.

Both users and devices may join a Djinn. When joining a Djinn, the user or device adds zero or more services to the Djinn and may access, subject to security constraints, any one of the services it contains. Thus, devices and users federate into a Djinn to share access to its services. The services of the Djinn appear programmatically as objects of the Java programming environment, which may include other objects, software components written in different programming languages, or hardware devices. A service has an interface definig the operations that can be requested of that service, and the type of the service determines the interfaces that make up that service.

Figure 1:
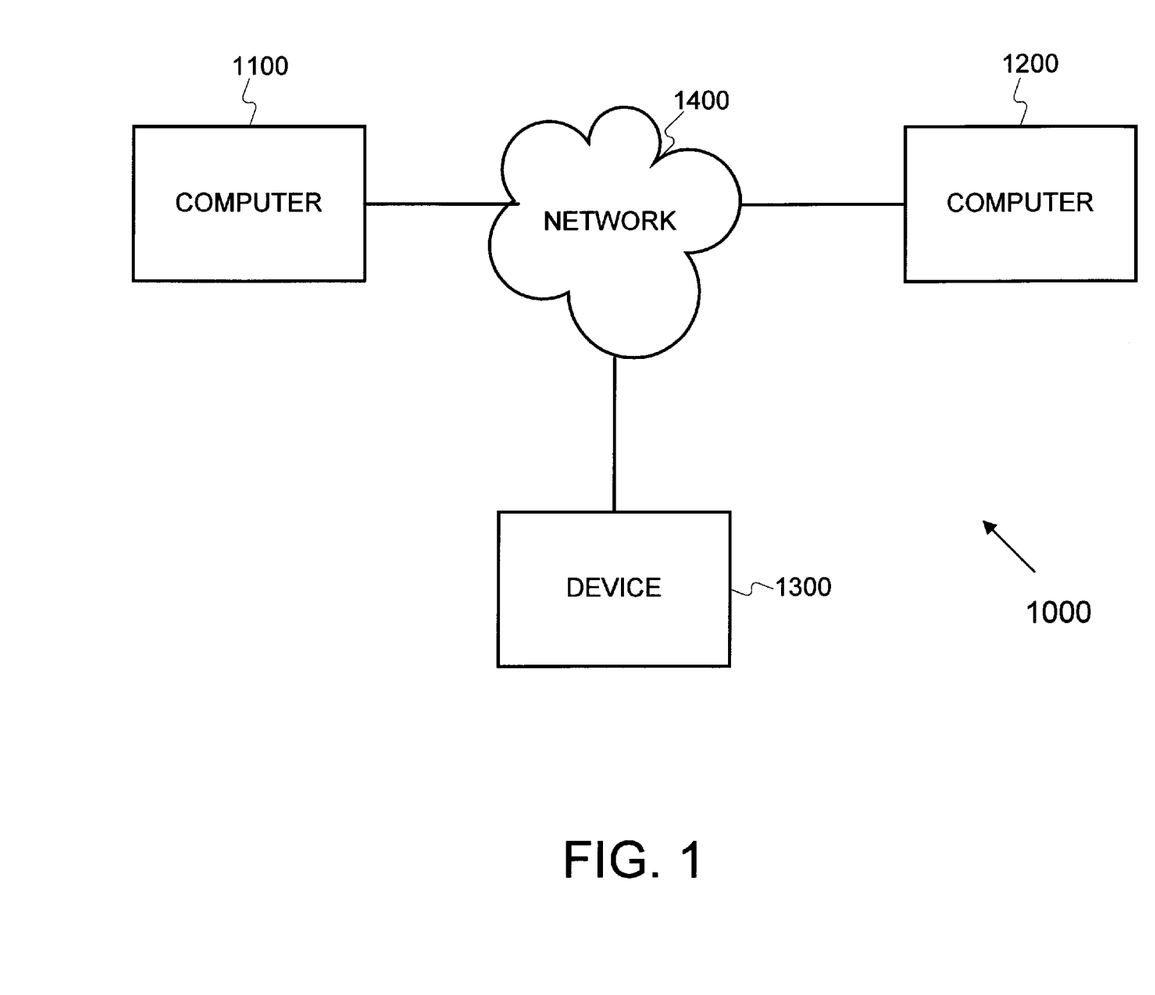
FIG. 1 is a diagram of a computer network consistent with the principles of the present invention.

FIG. 1 depicts the exemplary distributed system 1000 containing a computer 1100, a computer 1200, and a device 1300 interconnected by a network 1400. The computers 1100 and 1200 may include any conventional computers, such as IBM-compatible computers, or even "dumb" terminals. During typical operation, computers 1100 and 1200 may establish a client-server relationship to transmit and retrieve data.

The device 1300 may be any of a number of devices, such as a printer, fax machine, storage device, computer, or other devices. The network 1400 may be a local area network, wide area network, or the Internet. Although only two computers and one device are depicted as comprising the exemplary distributed system 1000, one skilled in the art will appreciate that the exemplary distributed system 1000 may include additional computers or devices.

Figure 2:
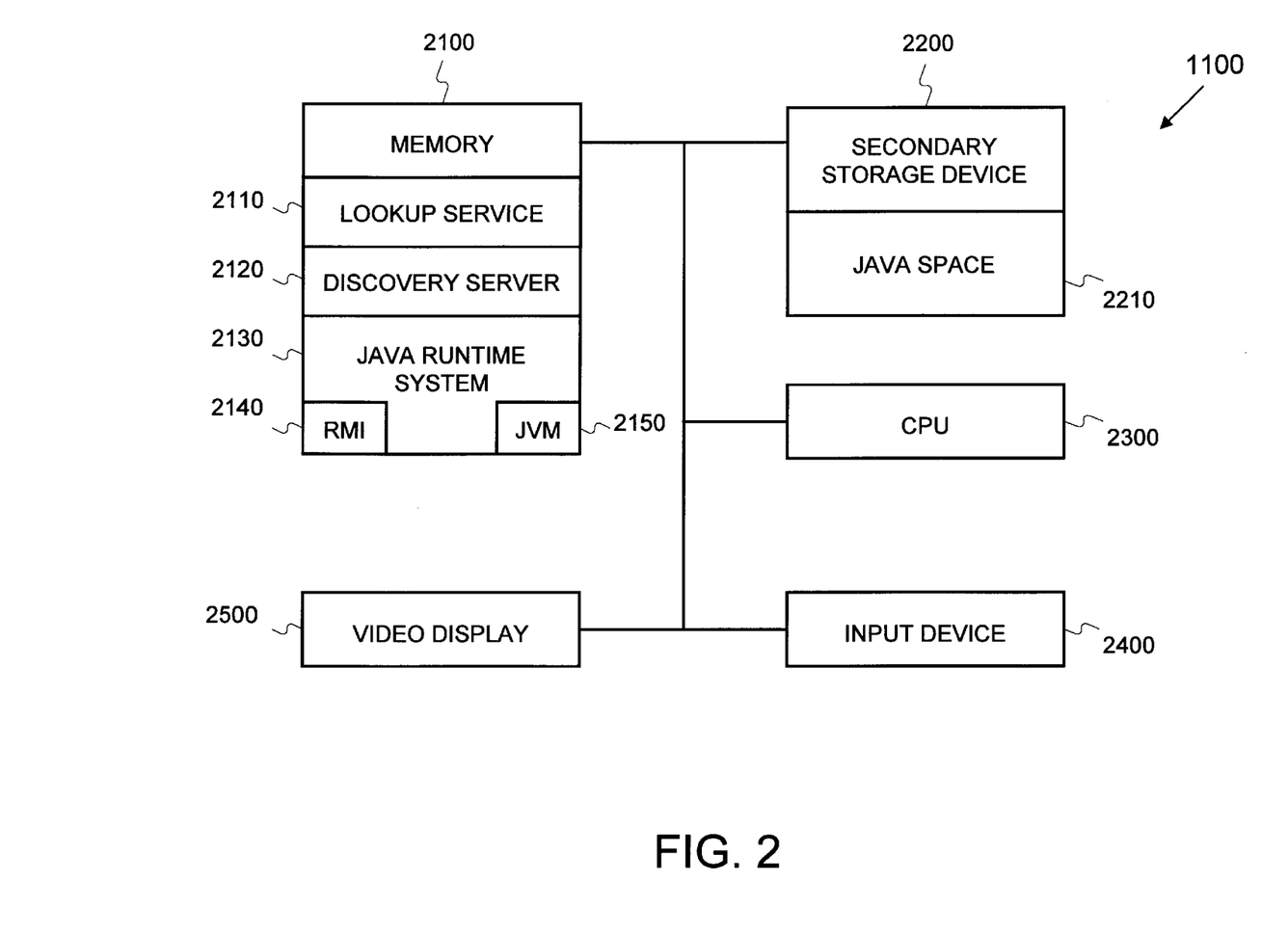
FIG. 2 is a diagram of a computer of FIG. 1 in an implementation consistent with the principles of the present invention.

FIG. 2 depicts the computer 1100 in greater detail to show a number of the software components of the exemplary distributed system 1000. One skilled in the art will appreciate that computer 1200 or device 1300 may be similarly configured. Computer 1100 includes a memory 2100, a secondary storage device 2200, a central processing unit (CPU) 2300, an input device 2400, and a video display 2500. The memory 2100 includes a lookup service 2110, a discovery server 2120, and a Java™ runtime system 2130. The Java runtime system 2130 includes the Java™ remote method invocation system (RMI) 2140 and a Java™ virtual machine (JVM) 2150. The secondary storage device 2200 includes a Java™ space 2210.

As mentioned above, the exemplary distributed system 1000 is based on the Java programming environment and thus makes use of the Java runtime system 2130. The Java runtime system 2130 includes the Java™ application programming interface (API), allowing programs running on top of the Java runtime system to access, in a platform-independent manner, various system functions, including windowing capabilities and networking capabilities of the host operating system. Since the Java API provides a single common API across all operating systems to which the Java runtime system 2130 is ported, the programs running on top of a Java runtime system run in a platform-independent manner, regardless of the operating system or hardware configuration of the host platform. The Java runtime system 2130 is provided as part of the Java™ software development kit available from Sun Microsystems of Mountain View, Calif.

The JVM 2150 also facilitates platform independence. The JVM 2150 acts like an abstract computing machine, receiving instructions from programs in the form of byte codes and interpreting these byte codes by dynamically converting them into a form for execution, such as object code, and executing them. RMI 2140 facilitates remote method invocation by allowing objects executing on one computer or device to invoke methods of an object on another computer or device. The RMI may be located within the JVM, and both the RMI and the JVM are provided as part of the Java software development kit.

The lookup service 2110 defines the services that are available for a particular Djinn. That is, there may be more than one Djinn and, consequently, more than one lookup service within the exemplary distributed system 1000. The lookup service 2110 contains one object for each service within the Djinn, and each object contains various methods that facilitate access to the corresponding service. The lookup service 2110 and its access are described in greater detail in co-pending U.S. patent application Ser. No. 09/044, 826, entitled "Method and System for Facilitating Access to a Lookup Service," which has previously been incorporated by reference.

The discovery server 2120 detects when a new device is added to the exemplary distributed system 1000 during a process known as boot and join or discovery, and when such a new device is detected, the discovery server passes a reference to the lookup service 2110 to the new device, so that the new device may register its services with the lookup service and become a member of the Djinn. After registration, the new device becomes a member of the Djinn, and as a result, it may access all the services contained in the lookup service 2110. The process of boot and join is described in greater detail in co-pending U.S. patent application Ser. No. 09/044,939entitled "Apparatus and Method for providing Downloadable Code for Use in Communicating with a Device in a Distributed System," which has previously been incorporated by reference.

The Java space 2210 is an object repository used by programs within the exemplary distributed system 1000 to store objects. Programs use the Java space 2210 to store objects persistently as well as to make them accessible to other devices within the exemplary distributed system. Java spaces are described in greater detail in co-pending U.S. patent application Ser. No. 08/971,529, entitled "Database System Employing Polymorphic Entry and Entry Matching," assigned to a common assignee, filed on Nov. 17, 1997, which is incorporated herein by reference. One skilled in the art will appreciate that the exemplary distributed system 1000 may contain many lookup services, discovery servers, and Java spaces.

EXEMPLARY CALL STACK

During typical operation, a client computer, such as computer 1100, executes threads (or processes) that make calls to access resources on a server, such as computer 1200 or device 1300 in FIG. 1. RMI 2140 (FIG. 2) determines the communication requirements associated with a call by a thread. According to an implementation consistent with the present invention, the communication requirements vary based on what routine (e.g., method, function) the thread is currently executing and which routine invoked the routine that is currently executing. The sequence of calls that resulted in execution of the currently executing routine of a thread is reflected in the call stack of the thread.

Figure 3:
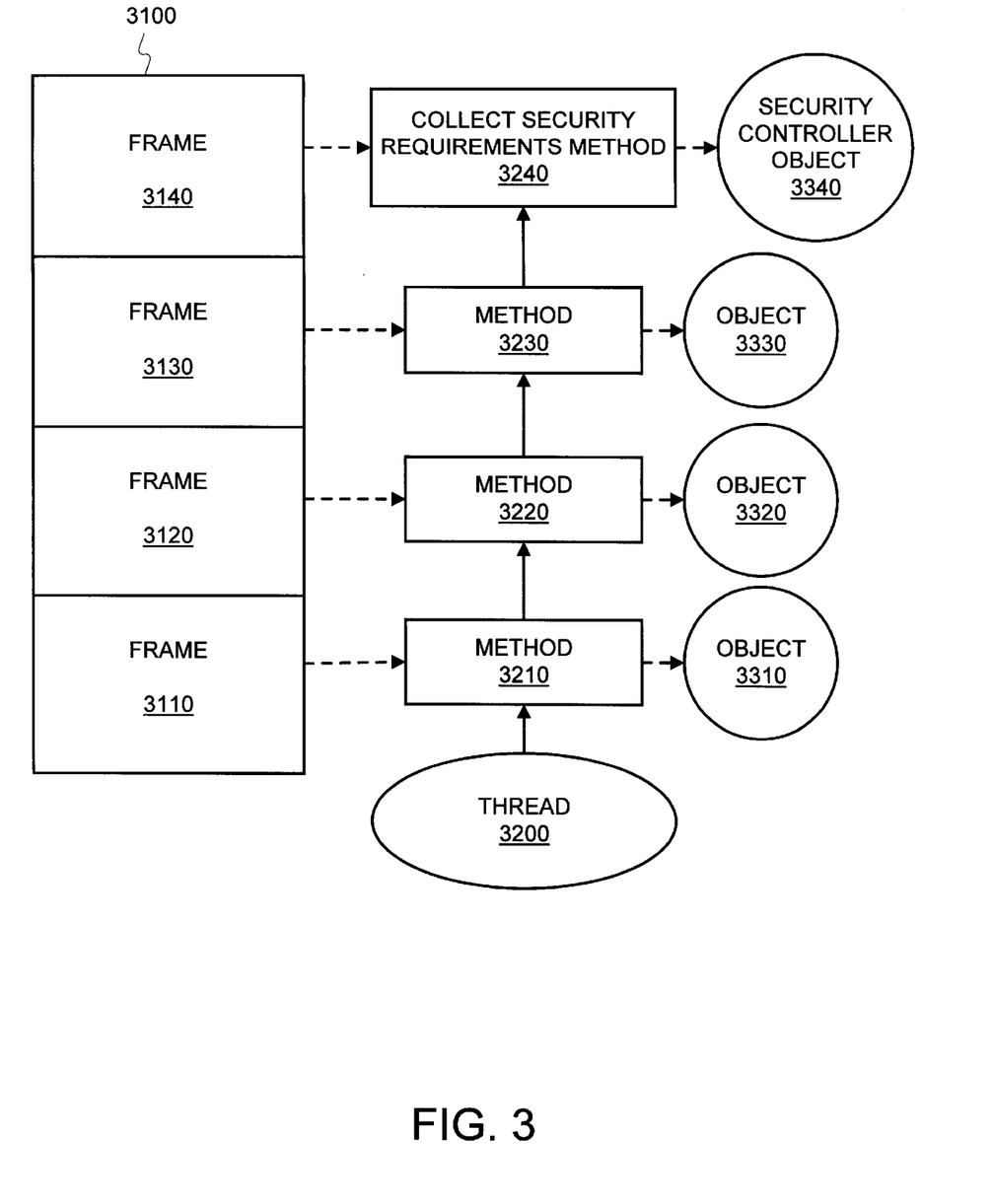
FIG. 3 is a diagram of a call stack associated with a thread on the computer of FIG. 2.

FIG. 3 illustrates an example of a call stack of a thread. Reference to the exemplary call stack shall be made to explain the operation of a security mechanism that ensures that the communication requirements of the routines comprising the thread are satisfied in the call.

FIG. 3 is a block diagram that includes a call stack 3100 associated with a thread 3200 in which the method 3210 of an object 3310 calls the method 3220 of another object 3320 that calls the method 3230 of yet another object 3330 that calls a collect communication requirements method 3240 of a security controller object 3340.

Thread 3200 is a thread executing on computer 1100. Call stack 3100 is a stack data structure representing a calling hierarchy of the methods invoked by thread 3200 at any given instance. At the instance illustrated in FIG. 3, call stack 3100 contains a frame for each execution of a method by the thread that has not yet completed.

Each frame 3110–3140 corresponds to the method that has been called but not yet completed by thread 3200. The relative positions of the frames on the call stack 3100 reflect the invocation order of the methods that correspond to the frames. When a method completes, the frame that corresponds to the method is removed from the top of the call stack 3100. When a method is invoked, a frame corresponding to the method is added to the top of the call stack 3100.

Each frame contains information about the method and the object that correspond to the frame. From this information, the class of the method can be determined by invoking a "get class" method provided for every object by JVM 2150. The information contained in the frame also includes the communication requirements for the corresponding method.

Assume, for example, thread 3200 invokes method 3210. While executing method 3210, thread 3200 invokes method 3220; while executing method 3220, thread 3200 invokes method 3230; and while executing method 3230, thread 3200 invokes method 3240. At this point, call stack 3100 represents the calling hierarchy of methods as shown in FIG. 3. Frame 3140 corresponds to method 3240, frame 3130 to method 3230, frame 3120 to method 3220, and frame 3110 to method 3210. When thread 3200 completes method 3240, frame 3140 is removed from the call stack 3100.

Each method on the call stack includes a set of communication requirements. The following code example illustrates one technique for setting the communication requirements for a method. Although the code example may resemble the Java programming language by Sun Microsystems, Inc., the example is for illustrative purposes only and is not meant to be representative of an actual code implementation.

```
try {
    Security.beginRequired (the requirements);
        [code to which the requirements apply]
} finally {
    Security.endScope O;
}
```

Because communication requirements are associated with a particular method, some mechanism must be provided to determine the communication requirements of a thread whose call stack contains multiple frames associated with multiple methods. According to an implementation consistent with the present invention, this determination is performed by a security controller object.

EXEMPLARY SECURITY CONTROLLER

According to an implementation consistent with the present invention, security controller object 3340 determines the communication requirements associated with a particular action requested by thread 3200. Specifically, before performing an action, such as a call to a server, RMI 2140 invokes the collect security requirements method 3240 of security controller object 3340. The collect security requirements method 3240 combines the communication requirements associated with each of the frames on the call stack 3100. Method 3240 combines the communication requirements to obtain the strictest requirements for the requested action. Method 3240 may perform the combining operation in any conventional manner.

If any method in the calling hierarchy requests confidentiality, integrity, or authenticate server, then method 3240 will designate for the action confidentiality, integrity, or authenticate server, respectively. If a method requests anonymity, method 3240 will designate anonymity for the action over any indication of no anonymity. If a method refuses to permit delegation, method 3240 will designate no delegation for the action over any authorization to delegate.

DETERMINING SECURITY REQUIREMENTS FOR AN ACTION

Figure 4:
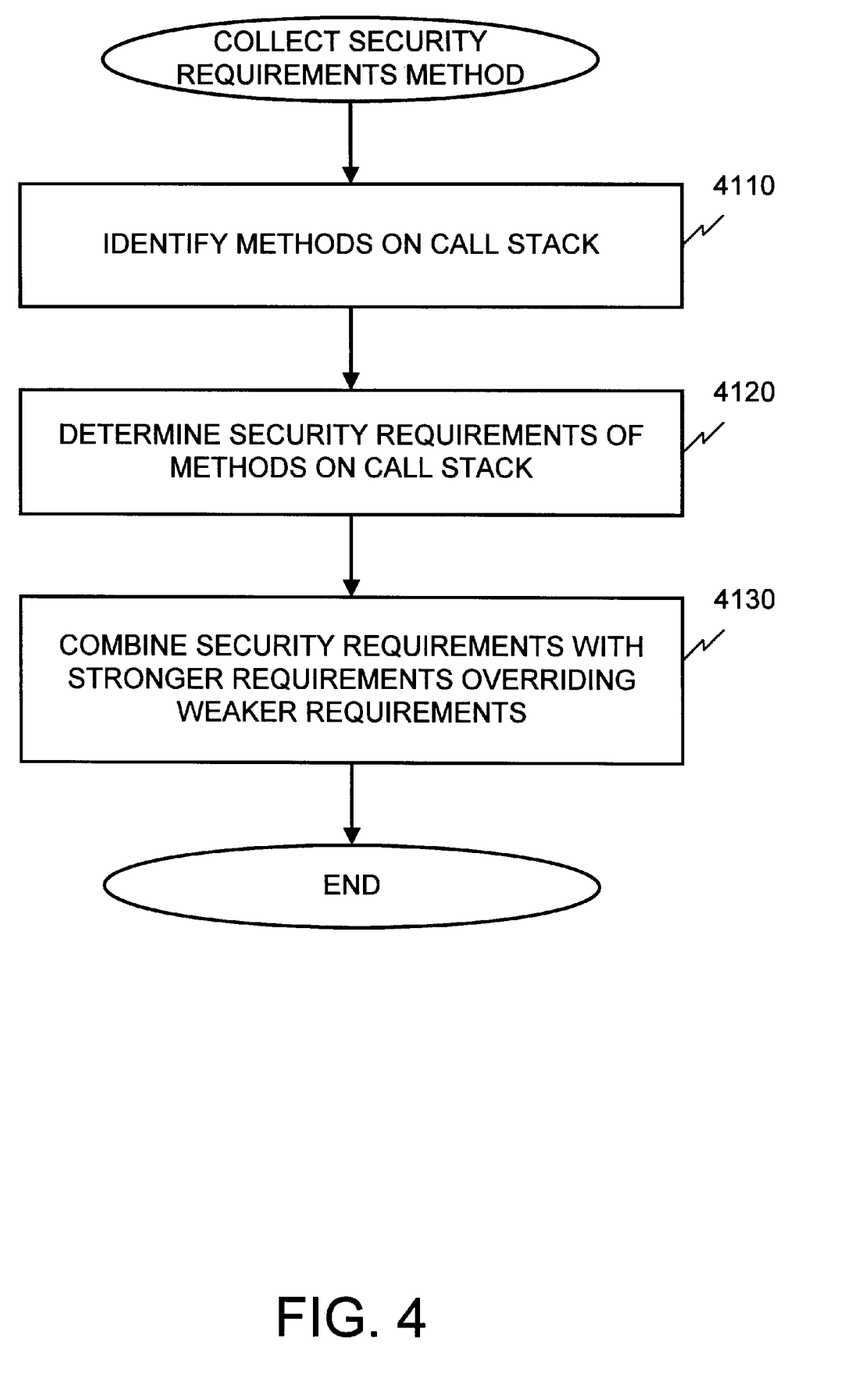
FIG. 4 is a flowchart of processing performed by the collect security requirements method of FIG. 3 in an implementation consistent with the principles of the present invention.

FIG. 4 is a flowchart of processing performed by the collect security requirements method 3240. Assume that thread 3200 is executing method 3230 when thread 3200 requests an action. Assume further that thread 3200 has invoked method 3210, method 3220, and method 3230 and has not completed them when thread 3200 invoked method 3240. The communication requirements associated with thread 3200 when the request for the action is made are stored in frames 3110–3130. Method 3240 first identifies the methods, methods 3210–3230, having frames located on the call stack 3100 [step 4100]. Method 3240 examines the frames 3110–3130 associated with methods 3210–3230, respectively, to determine the communication requirements requested by each of the methods [step 4120]. The security requirements for the action are determined by combining the communication requirements of the methods [step 4130]. When method 3240 combines the communication requirements, it overrides the weaker requirements with the stronger requirements, as described above. RMI 2140 performs the action adhering to the security requirements determined by method 3240.

If the action is a call to invoke a remote method on a server, for example, RMI 2140 obtains the security requirements of the server. RMI 2140 usually obtains the server's security requirements from a local copy of the server's security class library, containing the requirements. RMI 2140 uses the server's security requirements to determine whether the remote method supports the security requirements determined by method 3240. If the remote method does not support the security requirements, RMI 2140 notifies thread 3200 of this fact. RMI 2140 may do this by throwing an Exception.

If the remote method supports the security requirements, RMI 2140 determines what communication protocols are available, and selects one that satisfies a minimum of the combination of the security requirements determined by method 3240 and the server's security requirements. When RMI 2140 finds a communication protocol, RMI 2140 negotiates with the server to use the protocol for the call, and then initiates use of the protocol to perform the call.

ALTERNATIVE IMPLEMENTATIONS FOR DETERMINING

SECURITY REQUIREMENTS FOR AN ACTION

Figure 5:
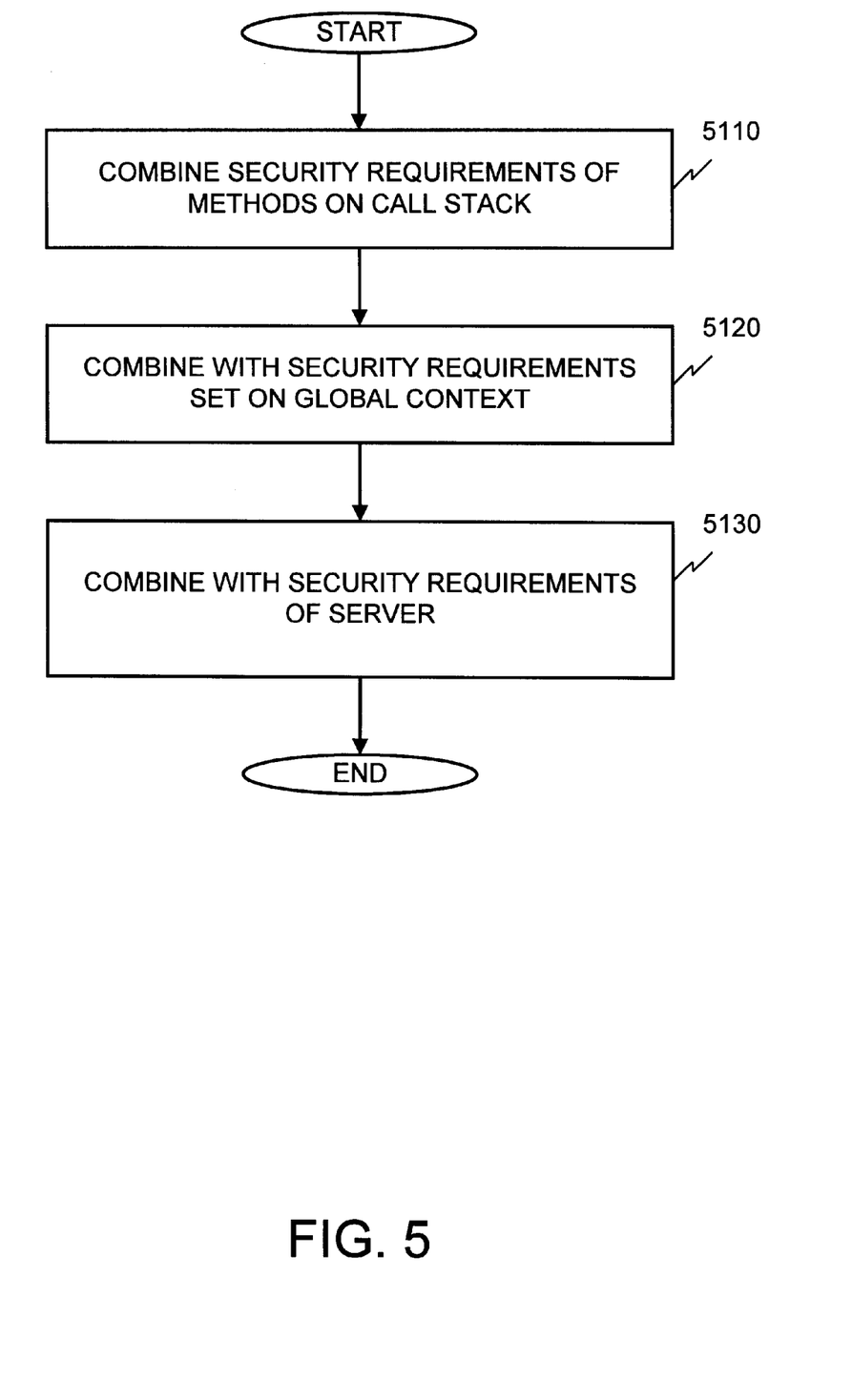
FIG. 5 is a flowchart of alternative implementations consistent with the present invention for determining the security requirements associated with an action.

FIG. 5 is a flowchart of alternative implementations consistent with the present invention for determining the security requirements associated with an action. The communication requirements of the methods having frames on the call stack are combined in the manner described above with reference to FIG. 4 [step 5110]. In one alternative implementation consistent with the present invention, the communication requirements of the methods with frames on the call stack are combined with the communication requirements set on a global context to obtain a combined set of communication requirements for the action [step 5120]. When combining communication requirements, stronger communication requirements override weaker ones.

In another implementation, the communication requirements of the methods with frames on the call stack are combined with the communication requirements of the server that will perform the action to obtain the communication requirements for the action [step 5130]. Again, when combining communication requirements, stronger communication requirements override weaker ones.

In yet another implementation, the combined set of communication requirements (i.e., the communication requirements of the methods with frames on the call stack and the communication requirements set on a global context) is combined with the communication requirements of the server that will perform the action to obtain the communication requirements for the action [step 5130]. Again, when combining communication requirements, stronger communication requirements override weaker ones.

CONCLUSION

Systems and methods consistent with the principles of the present invention determine the security requirements associated with an action by combining the security requirements associated with each of the methods in a calling hierarchy.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. The scope of the invention is defined by the claims and their equivalents.

Although systems and methods consistent with the present invention are described as operating in the exemplary distributed system and the Java programming environment, one skilled in the art will appreciate that the present invention can be practiced in other systems and other programming environments. Additionally, although aspects of the present invention are described as being stored in memory, one skilled in the art will appreciate that these aspects can also be stored on or read from other types of computer-readable media, such as secondary storage devices, like hard disks, floppy disks, or CD-ROM; a carrier wave from the Internet; or other forms of RAM or ROM. Sun, Sun Microsystems, the Sun logo, Java, and Java-based trademarks are trademarks or registered trademarks of Sun Microsystems Inc. in the United States and other countries.

What is claimed is:

1. A system that obtains security requirements for an action requested by a caller executing on a computer, the caller invoking at least one of a plurality of methods during execution, the system comprising:
   a call stack that stores representations of the plurality of methods in an order of invocation by the caller and security requirements for the plurality of methods; and
   a determination unit that dynamically combines the method security requirements from the call stack to obtain the security requirements for the requested action.

2. The system of claim 1, wherein the call stack stores representations and security requirements of only ones of the methods that are currently invoked.

3. The system of claim 1, wherein the method security requirements include a confidentiality requirement through which the caller ensures privacy during communication.

4. The system of claim 1, wherein the method security requirements include an integrity requirement through which the caller ensures that communication remains unaltered during transmission.

5. The system of claim 1, wherein the method security requirements include an anonymity requirement through which the caller can remain anonymous in the requested action.

6. The system of claim 1, wherein the method security requirements include a server authentication requirement through which the caller requests a device to authenticate itself.

7. The system of claim 1, wherein the method security requirements include a delegation requirement through which the caller authorizes a device to delegate under the caller's identity.

8. The system of claim 1, wherein the determination unit includes:
- a combination unit that combines the method security requirements from the call stack, overriding weaker method security requirements with stronger method security requirements.

9. The system of claim 1, wherein the caller is a thread executing on the computer.

10. The system of claim 1, wherein the caller is a program executing on the computer.

11. A system that obtains security requirements for an action requested by a thread executing on a computer, the thread invoking at least one of a plurality of methods during execution, the system comprising:
- means for storing a method identifier and storing security requirements for a plurality of methods when invoked by the thread;
- means for dynamically combining the stored method security requirements; and
- means for obtaining the security requirements for the requested action from the combined method security requirements.

12. A computer-implemented method for determining security requirements of an action requested by an operation executing on a computer, the operation invoking at least one of a plurality of functions during execution, the method comprising the steps of:
- storing a function identifier and storing security requirements for a plurality of functions when invoked by the operation;
- receiving a request for the action from the operation;
- dynamically combining the stored function security requirements; and
- determining the security requirements of the requested action from the combined function security requirements.

13. A computer-readable medium containing instructions for controlling a computer to perform an action requested by an operation executing on the computer, the operation invoking a plurality of functions during execution, said instructions comprising:
- storing a function identifier and storing security requirements for a plurality of functions when invoked by the operation;
- receiving a request for the action from the operation;
- dynamically combining the stored function security requirements;
- determining security requirements of the requested action from the combined function security requirements; and
- performing the requested action using the determined security requirements.

14. A data processing system comprising:
- a memory including:
  - a program that invokes a plurality of methods during execution,
  - a call stack that stores identifiers of the methods when invoked by the program and security requirements requested by each of the methods, and
  - a runtime environment that receives a request for an action from the program, that combines the method security requirements of the methods in the call stack, that determines security requirements for the requested action from the combined method security requirements, and that performs the requested action using the determined security requirements; and a
- processor for executing the runtime environment and the program.

15.

A method for determining the security requirements for an action requested by a thread executing on a computer, the method comprising:
- receiving a request for the action from the thread;
- storing on a call stack a plurality of frames, including security requirements, corresponding to a plurality of methods invoked by the thread in an order of invocation by the thread; and
- dynamically combining the method security requirements from the call stack to obtain the security requirements for the requested action.

16. The method of claim 15, wherein the action includes invoking a remote method on a server, and wherein the step of storing on the call stack the plurality of frames, includes the step of obtaining the security requirements for the server.

* * * * *